US011832339B2

(12) United States Patent
Shi et al.

(10) Patent No.: US 11,832,339 B2
(45) Date of Patent: Nov. 28, 2023

(54) HANDLING APPLICATION PROTOCOL IDENTITY FOR A UE-ASSOCIATED LOGICAL CONNECTION

(71) Applicant: Telefonaktiebolaget LM Ericsson (publ), Stockholm (SE)

(72) Inventors: Nianshan Shi, Järfälla (SE); Markus Drevö, Linköping (SE); Martin Israelsson, Spånga (SE); Alexander Vesely, Feldbach (AT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 54 days.

(21) Appl. No.: 16/968,734

(22) PCT Filed: Feb. 14, 2019

(86) PCT No.: PCT/SE2019/050126
§ 371 (c)(1),
(2) Date: Aug. 10, 2020

(87) PCT Pub. No.: WO2019/164438
PCT Pub. Date: Aug. 29, 2019

(65) Prior Publication Data
US 2021/0007175 A1     Jan. 7, 2021

Related U.S. Application Data

(60) Provisional application No. 62/634,144, filed on Feb. 22, 2018.

(51) Int. Cl.
*H04W 76/30* (2018.01)
*H04W 24/02* (2009.01)
*H04W 92/20* (2009.01)

(52) U.S. Cl.
CPC ........... *H04W 76/30* (2018.02); *H04W 24/02* (2013.01); *H04W 92/20* (2013.01)

(58) Field of Classification Search
CPC ..... H04W 36/08; H04W 76/10; H04W 72/04; H04W 8/26; H04W 92/045; H04W 92/20; H04W 76/30; H04W 24/02
See application file for complete search history.

(56) References Cited

U.S. PATENT DOCUMENTS

| 8,266,294 B2 | 9/2012 | Banes et al. |
| 2004/0205769 A1 | 10/2004 | Ruutu |

(Continued)

FOREIGN PATENT DOCUMENTS

| CA | 2651076 A1 * | 11/2007 | .......... H04W 76/022 |
| CN | 102143538 A | 8/2011 | |

(Continued)

OTHER PUBLICATIONS

3rd Generation Partnership Project, "3rd Generation Partnership Project; Technical Specification Group Radio Access Network; NG-RAN; NG Application Protocol (NGAP) (Release 15)", Technical Specification, 3GPP TS 38.413 V0.6.0, Jan. 1, 2018, pp. 1-94, 3GPP, France.

(Continued)

*Primary Examiner* — Matthew C Sams
(74) *Attorney, Agent, or Firm* — COATS & BENNETT, PLLC

(57) ABSTRACT

A network node (300a) receives, over an interface between the network node (300a) and a further network node (300b), a message comprising paired user equipment (UE) identifiers for UE identification over the interface to the network node (300a) and further network node (300b), respectively. Responsive to determining that the identifier for UE identification to the network node (300a) uniquely identifies a (Continued)

⟋ 200

RECEIVING, OVER AN INTERFACE BETWEEN THE NETWORK NODE AND A FURTHER NETWORK NODE, A MESSAGE COMPRISING PAIRED USER EQUIPMENT (UE) IDENTIFIERS FOR UE IDENTIFICATION OVER THE INTERFACE TO THE NETWORK NODE AND FURTHER NETWORK NODE, RESPECTIVELY
210

RESPONSIVE TO DETERMINING THAT THE IDENTIFIER FOR UE IDENTIFICATION TO THE NETWORK NODE UNIQUELY IDENTIFIES A UE TO THE NETWORK NODE, VALIDATING THE MESSAGE IRRESPECTIVE OF WHETHER THE IDENTIFIER FOR UE IDENTIFICATION TO THE FURTHER NETWORK NODE UNIQUELY IDENTIFIES THE UE TO THE FURTHER NETWORK NODE
220

UE (150) to the network node (300*a*), the network node (300*a*) validates the message irrespective of whether the identifier for UE identification to the further network node (300*b*) uniquely identifies the UE (150) to the further network node (300*b*).

26 Claims, 4 Drawing Sheets

(56) References Cited

U.S. PATENT DOCUMENTS

| | | | |
|---|---|---|---|
| 2007/0213071 A1 | 9/2007 | Hwang | |
| 2009/0316604 A1* | 12/2009 | Singh | H04W 76/11 |
| | | | 370/254 |
| 2010/0008507 A1* | 1/2010 | Galante | H04W 12/041 |
| | | | 380/278 |
| 2010/0142407 A1* | 6/2010 | Serravalle | H04W 8/26 |
| | | | 370/254 |
| 2013/0083717 A1* | 4/2013 | Vos | H04W 4/06 |
| | | | 370/312 |
| 2014/0148174 A1 | 5/2014 | Teyeb et al. | |
| 2014/0370900 A1* | 12/2014 | Byun | H04W 36/34 |
| | | | 455/437 |
| 2015/0131430 A1 | 5/2015 | Chan et al. | |
| 2016/0044717 A1* | 2/2016 | Serravalle | H04W 76/10 |
| | | | 370/329 |
| 2018/0070393 A1* | 3/2018 | Serravalle | H04W 8/26 |
| 2018/0132143 A1 | 5/2018 | Sirotkin et al. | |
| 2018/0349974 A1* | 12/2018 | Dutta | G06F 16/9554 |

FOREIGN PATENT DOCUMENTS

| | | | |
|---|---|---|---|
| CN | 1802638 B | 10/2012 | |
| CN | 104365170 A | 2/2015 | |
| CN | 107683621 A | 2/2018 | |
| EP | 1781057 A1 | 5/2007 | |
| EP | 2519043 A1 * | 10/2012 | H04W 72/04 |
| EP | 2519043 A1 | 10/2012 | |
| RU | 2586892 C2 | 6/2016 | |
| WO | 2015119558 A1 | 8/2015 | |

OTHER PUBLICATIONS

3rd Generation Partnership Project, "3rd Generation Partnership Project; Technical Specification Group Radio Access Network; NG-RAN; Xn application protocol (XnAP) (Release 15)", Technical Specification, 3GPP TS 38.423 V0.6.0, Jan. 1, 2018, pp. 1-76, 3GPP, France.

Thales, "Study on solutions evaluation for NR to support Non Terrestrial Network", 3GPP TSG RAN meeting #80, La Jolla, USA, Jun. 11, 2018, pp. 1-5, RP-181370, 3GPP.

Ericsson, "Response to R3-181213", 3GPP TSG-RAN WG3#99 meeting, Athens, Greece, Feb. 26, 2018, pp. 1-10, R3-181371, 3GPP, France.

* cited by examiner

```
                                    ┌─ 200
```

```
┌─────────────────────────────────────────────────────────────────────────┐
│   RECEIVING, OVER AN INTERFACE BETWEEN THE NETWORK NODE AND A FURTHER   │
│  NETWORK NODE, A MESSAGE COMPRISING PAIRED USER EQUIPMENT (UE) IDENTIFIERS│
│   FOR UE IDENTIFICATION OVER THE INTERFACE TO THE NETWORK NODE AND FURTHER│
│                      NETWORK NODE, RESPECTIVELY                         │
│                                  210                                    │
└─────────────────────────────────────────────────────────────────────────┘
                                   │
                                   ▼
┌─────────────────────────────────────────────────────────────────────────┐
│  RESPONSIVE TO DETERMINING THAT THE IDENTIFIER FOR UE IDENTIFICATION TO THE│
│  NETWORK NODE UNIQUELY IDENTIFIES A UE TO THE NETWORK NODE, VALIDATING THE│
│  MESSAGE IRRESPECTIVE OF WHETHER THE IDENTIFIER FOR UE IDENTIFICATION TO THE│
│   FURTHER NETWORK NODE UNIQUELY IDENTIFIES THE UE TO THE FURTHER NETWORK│
│                                  NODE                                   │
│                                  220                                    │
└─────────────────────────────────────────────────────────────────────────┘
```

```
┌─────────────────────────────────────────────────────────────────────────┐
│   RECEIVING, OVER AN INTERFACE BETWEEN THE NETWORK NODE AND A FURTHER   │
│  NETWORK NODE, A MESSAGE COMPRISING PAIRED USER EQUIPMENT (UE) IDENTIFIERS│
│   FOR UE IDENTIFICATION OVER THE INTERFACE TO THE NETWORK NODE AND FURTHER│
│                      NETWORK NODE, RESPECTIVELY                         │
│                                  240                                    │
└─────────────────────────────────────────────────────────────────────────┘
                                   │
                                   ▼
┌─────────────────────────────────────────────────────────────────────────┐
│ IRRESPECTIVE OF WHETHER THE IDENTIFIER FOR UE IDENTIFICATION TO THE FURTHER│
│    NETWORK NODE UNIQUELY IDENTIFIES A UE TO THE FURTHER NETWORK NODE,   │
│    DETERMINING THAT THE MESSAGE IS INVALID IN RESPONSE TO AT LEAST ONE OF:│
│  DETERMINING THAT THE IDENTIFIER FOR UE IDENTIFICATION TO THE NETWORK   │
│     NODE FAILS TO UNIQUELY IDENTIFY A UE TO THE NETWORK NODE; AND       │
│   DETERMINING THAT THE PAIRED UE IDENTIFIERS FAIL TO JOINTLY IDENTIFY A │
│          LOGICAL UE CONNECTION KNOWN TO THE NETWORK NODE                │
│                                  250                                    │
└─────────────────────────────────────────────────────────────────────────┘
```

FIG. 4

HANDLING APPLICATION PROTOCOL IDENTITY FOR A UE-ASSOCIATED LOGICAL CONNECTION

RELATED APPLICATIONS

This application claims priority to U.S. Provisional Patent Application Ser. No. 62/634,144, filed 22 Feb. 2018, the entire contents of which are incorporated by reference herein.

TECHNICAL FIELD

The present disclosure generally relates to the field of wireless communication networks, and more particularly relates to message evaluation with respect to an interface between network nodes.

BACKGROUND

According to the Long Term Evolution (LTE) standard, an Application Protocol Identity (AP ID) is allocated when a new User Equipment (UE)-associated logical connection is created in either an eNodeB (eNB, a type of base station) or a Mobility Management Entity (MME). The AP ID uniquely identifies a logical connection associated with a User Equipment (UE) over the S1 interface (i.e., between an eNB and MME) or X2 interface (i.e., between eNBs) within a given node (i.e., the eNB or MME). On the logical S1 or X2 connection, control plane messages (S1AP, X2AP) associated with the UE are sent. This connection is established during the first S1/X2AP message exchange between the S1/X2 peer nodes. The connection is generally maintained as long as UE-associated S1/X2AP messages need to be exchanged over S1/X2. The UE-associated logical S1-connection uses the identities MME UE S1AP ID and eNB UE S1AP ID. The UE-associated logical X2-connection uses the identities Old eNB UE X2AP ID and New eNB UE X2AP ID. When a node (MME or eNB) receives a UE associated S1/X2AP message the node retrieves the associated UE based on the S1/X2AP ID.

This initial message exchange includes a "first message" and "first returned message." Upon receipt of a "first message" that has a new AP ID from a sending node, the receiving node stores the AP ID provided by the sending node for the duration of the logical connection. The receiving node assigns its own AP ID to be used to identify the logical connection associated with the UE and includes its own AP ID, as well as the previously received new AP ID from the sending node, in the "first returned message" to the sending node. Messages to and from the sending node with respect to this logical connection subsequently include both of these AP IDs (i.e., the AP ID of the sending node and the AP ID of the receiving node). The sending and receiving nodes thereafter check the AP IDs of these messages, e.g., for message routing purposes.

In contrast to the above (which relates to the S1 and/or X2 interfaces), the 3GPP specification TS 38.413 specifies behavior relating to AP IDs over the Next Generation Application Protocol (NGAP) interface, e.g., when an AP ID error is detected for a UE-associated logical connection, with similar principles applying to the XnAP interface. In practice, the cost to make the necessary checks to detect error cases in a node routing on the local AP ID may be quite high, with implementation to perform the specified AP ID handling having a negative impact on performance. One or more other error cases may additionally or alternatively impact performance negatively.

SUMMARY

Embodiments of the present disclosure are directed to efficiently evaluating paired UE identifiers in a message between network nodes. The paired UE identifiers comprises a UE identifier for UE identification over the interface to a network node, and another UE identifier for UE identification over the interface to a further network node. In particular, the network node may validate (or determine that the message is invalid) irrespective of whether the identifier for UE identification uniquely identifies the UE to the further network node, according to various embodiments.

More specifically, embodiments of the present disclosure include a method of message validation performed by a network node. The method comprises receiving, over an interface between the network node and a further network node, a message comprising paired user equipment (UE) identifiers for UE identification over the interface to the network node and further network node, respectively. The method further comprises, responsive to determining that the identifier for UE identification to the network node uniquely identifies a UE to the network node, validating the message irrespective of whether the identifier for UE identification to the further network node uniquely identifies the UE to the further network node.

In some embodiments, validating the message is in further response to determining that the paired identifiers jointly identify a logical connection of the UE known to the network node.

Additionally or alternatively, in some embodiments, the network node is a radio access network node. In other embodiments, the network node is a core network node.

Additionally or alternatively, in some embodiments, the further network node is a radio access network node. In other embodiments, the further network node is a core network node.

Other embodiments include a network node for performing message validation. The network node is configured to receive, over an interface between the network node and a further network node, a message comprising paired UE identifiers for UE identification over the interface to the network node and further network node, respectively. The network node is further configured to, responsive to determining that the identifier for UE identification to the network node uniquely identifies a UE to the network node, validate the message irrespective of whether the identifier for UE identification to the further network node uniquely identifies the UE to the further network node.

In some embodiments, the network node comprises a processor and a memory. The memory contains instructions executable by the processor whereby the network node is operative to perform the receiving, determining, and validating.

In some embodiments, the network node is configured to perform any of the network node methods of message validation described above.

Other embodiments include a method of error detection performed by a network node. The method comprises receiving, over an interface between the network node and a further network node, a message comprising paired UE identifiers for UE identification over the interface to the network node and further network node, respectively. The method further comprises, irrespective of whether the identifier for UE identification to the further network node uniquely identifies a UE to the further network node, determining that the message is invalid in response to at least one of determining that the identifier for UE identification to the network node fails to uniquely identify a UE to the network node, or determining that the paired UE identifiers fail to jointly identify a logical UE connection known to the network node.

In some embodiments, the method further comprises initiating an error indication procedure to trigger release, by the further network node, of a logical connection of a UE identified by at least one of the paired identifiers.

Additionally or alternatively, in some embodiments, the method further comprises, responsive to determining that the paired UE identifiers fail to jointly identify the logical UE connection known to the network node, releasing a logical connection of a UE identified by the identifier for UE identification to the network node.

Additionally or alternatively, in some embodiments, the network node is a radio access network node. In other embodiments, the network node is a core network node.

Additionally or alternatively, in some embodiments, the further network node is a radio access network node. In other embodiments, the further network node is a core network node.

Other embodiments include a network node for performing error detection. The network node is configured to receive, over an interface between the network node and a further network node, a message comprising paired UE identifiers for UE identification over the interface to the network node and further network node, respectively. The network node is further configure to, irrespective of whether the identifier for UE identification to the further network node uniquely identifies a UE to the further network node, determine that the message is invalid in response to at least one of determining that the identifier for UE identification to the network node fails to uniquely identify a UE to the network node, or determining that the paired UE identifiers fail to jointly identify a logical UE connection known to the network node.

In some embodiments, the network node comprises a processor and a memory. The memory contains instructions executable by the processor whereby the network node is operative to perform the receiving and determining.

In some embodiments, the network node is configured to perform any of the network node methods of error detection described above.

Other embodiments include a computer program comprising instructions which, when executed on at least one processor of a network node (e.g., a radio access node or core network node), cause the at least one processor to carry out any of the methods described above.

Other embodiments include a carrier containing the computer program of the preceding claim, wherein the carrier is one of an electronic signal, optical signal, radio signal, or computer readable storage medium.

Any of the embodiments described above may further comprise one or more of the features described below.

BRIEF DESCRIPTION OF THE FIGURES

Aspects of the present disclosure are illustrated by way of example and are not limited by the accompanying figures, with like references indicating like elements. In general, when a reference numeral in the drawings comprises a letter designation, discussion of a specific instance of an illustrated element will use the appropriate corresponding letter designation (e.g., RAN node 140a). However, the letter designation will be omitted in order to refer generically to the illustrated subject matter (e.g., discussion of a RAN node 140 generally, rather than discussion of particular RAN nodes 140a, 140b).

FIGS. 3 and 4 are flow diagrams, each of which illustrates an example method, according to one or more embodiments of the present disclosure.

DETAILED DESCRIPTION

Figure 1:
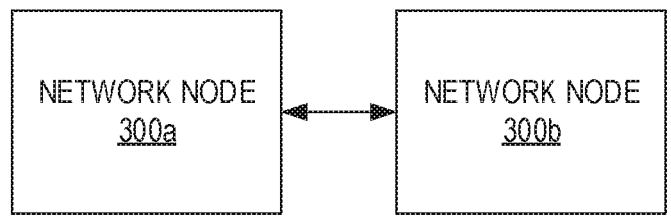
FIG. 1 is a schematic block diagram illustrating example network nodes, according to one or more embodiments of the present disclosure.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to at least one of each of the items in the list (e.g., at least one of A and at least one of B).

There currently exist one or more challenges with respect to one or more of the error cases relating to AP IDs for a UE-associated logical connection identified by, e.g., the 3GPP specification TS 38.413. Such error cases may include the A1, A2, A3, and A4 error cases described therein. In particular, the cost to make the necessary checks to detect error cases A1 and/or A2 in a node routing on the local AP ID may be quite high, with implementation to perform the specified AP ID handling having a negative impact on performance. One or more other error cases may additionally or alternatively impact performance negatively.

The A1 error case may occur when a node receives a first message that includes a remote AP ID which is erroneous. For example, the A1 error case may occur when the AP ID is used for another UE for the same peer node.

The A2 error case may occur when a node receives a "first returned message" that includes a remote AP ID which has been stored previously for another UE-associated logical connection for the same peer node.

The A3 error case may occur when a node receives a "first returned message" that includes an inconsistent AP ID pair. For example, the A3 error case may occur when the local AP ID is unknown or is already allocated to another UE-associated logical connection.

The A4 error case may occur when a node receives a message (e.g., other than the first or first returned messages) that includes AP ID(s) identifying a logical connection that is unknown to the node, for the same Next Generation (NG) interface.

Certain aspects of the present disclosure and their embodiments may provide solutions to these or other challenges. In some embodiments, to handle the AP ID for a UE-associated logical connection, the node receiving a message checks if the local AP ID (if any) is known, and only checks the remote AP ID in the message (if any) for consistency with the remote AP ID with which the signaling connection has been established. Thus, the receiving node refrains from checking, e.g., the uniqueness of the AP ID allocated by the remote node for the same peer node. In some embodiments, this enables cost and/or performance efficient AP ID handling for a UE-associated logical connection, particularly in embodiments in which the entities managing the UE contexts are distributed.

Certain embodiments may, for example, provide one or more of the following technical advantages. In particular, embodiments of the NG-RAN node may efficiently route received messages over the NG interface using the RAN UE NGAP ID in the message. Additionally or alternatively, in embodiments in which the entities managing UE contexts are distributed, the complexity of checking the remote AP ID may be reduced. Additionally or alternatively, performing error checking at the destination where the UE context is stored may be computationally easier. Embodiments may provide one or more other advantages.

FIG. 1 illustrates example network nodes 300a, 300b in a communication network (not shown). As will be discussed in further detail below (e.g., with respect to FIG. 7), one of the network nodes 300a, 300b may be regarded as a sending node, and the other may be regarded as a receiving node. The network nodes 300a, 300b communicate with each other over an interface between the network nodes 300a, 300b.

The network nodes 300a, 300b exchange information about and/or manage UE contexts. According to embodiments, a UE context is a block of information associated with an active UE. The block of information may comprise, for example, information required to maintain access network service towards the active UE. Such information may include, for example, state information, security information, capability information, and/or identities of the UE-associated logical connection, e.g., between the network nodes 300a, 300b. A UE context may be established when the UE completes a transition to an active state or after completion of handover resource allocation during handover preparation, for example.

Figure 2:
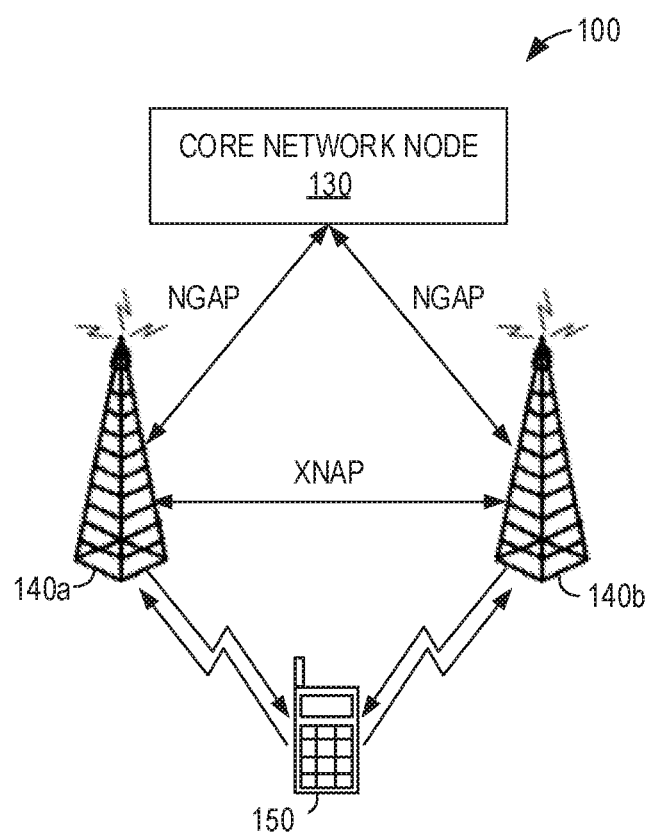
FIG. 2 is a schematic block diagram illustrating an example network environment, according to one or more embodiments of the present disclosure.

FIG. 2 illustrates an example network environment 100 that may include network nodes 300a, 300b that, e.g., exchange information as discussed above. The example network environment 100 includes a core network node 130, RAN nodes 140a, 140b, and a UE 150. Other examples of the network environment 100 may include different quantities of the elements depicted therein. According to particular embodiments RAN node 140a may be a sending node, and either RAN node 140b or core network node 130 may be a receiving node (e.g., as discussed below with respect to FIG. 7). According to other embodiments, any of the RAN nodes 140a, 140b and core network node 130 may be either a sending or receiving node.

The core network node 130 communicates (e.g., via appropriate signalling and/or messaging) with RAN nodes 140 over an interface. In this example, the interface between the core network node 130 and each of the RAN nodes 140a, 140b is an NGAP interface. Examples of the core network node 130 include (but are not limited to) an Access and Mobility Management Function (AMF) and an MME. Examples of a RAN node 140 include (but are not limited to) an NG-RAN node, an eNB, and a gNB.

The RAN nodes 140a, 140b also communicate (e.g., via appropriate signalling and/or messaging) with each other over an interface. In this example, the interface between the RAN nodes 140a, 140b is an XNAP interface.

RAN nodes 140 also communicate with the UE 150 (e.g., via appropriate signalling and/or messaging) with each other over a radio interface. In this example, the radio interface comprises an uplink for carrying transmissions from the RAN node 140 to the UE 150, and a downlink for carry transmissions from the UE 150 to the RAN node 140. Examples of the UE include (but are not limited to) a personal computer, a laptop computer, a desktop computer, a workstation, a smartphone, a tablet computer, a wearable computer, and/or a smart appliance. In some embodiments, the UE 150 is mobile, and may communicate with either, both, or neither of the RAN nodes 140a, 140b over time, as the UE moves relative to the RAN nodes 140a, 140b, for example.

FIG. 3 depicts a method 200 of message validation performed by a network node 300a in accordance with particular embodiments. The method 200 includes receiving, over an interface between the network node 300a and a further network node 300b, a message comprising paired user equipment (UE) identifiers for UE identification over the interface to the network node 300a and further network node 300b, respectively (block 210). The method 200 further comprises, responsive to determining that the identifier for UE identification to the network node 300a uniquely identifies a UE 150 to the network node 300a, validating the message irrespective of whether the identifier for UE identification to the further network node 300b uniquely identifies the UE 150 to the further network node 300b (block 220).

FIG. 4 depicts a method 230 of error detection performed by a network node 300a in accordance with particular embodiments. The method 230 includes receiving, over an interface between the network node 300a and a further network node 300b, a message comprising paired UE identifiers for UE identification over the interface to the network node 300a and further network node 300b, respectively (block 240). The method 230 further comprises, irrespective of whether the identifier for UE identification to the further network node 300b uniquely identifies a UE 150 to the further network node 300b, determining that the message is invalid in response to at least one of determining that the identifier for UE identification to the network node 300a fails to uniquely identify a UE 150 to the network node 300a; and determining that the paired UE identifiers fail to jointly identify a logical UE connection known to the network node 300a (block 250).

Note that the apparatuses (e.g., the network nodes 300) described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
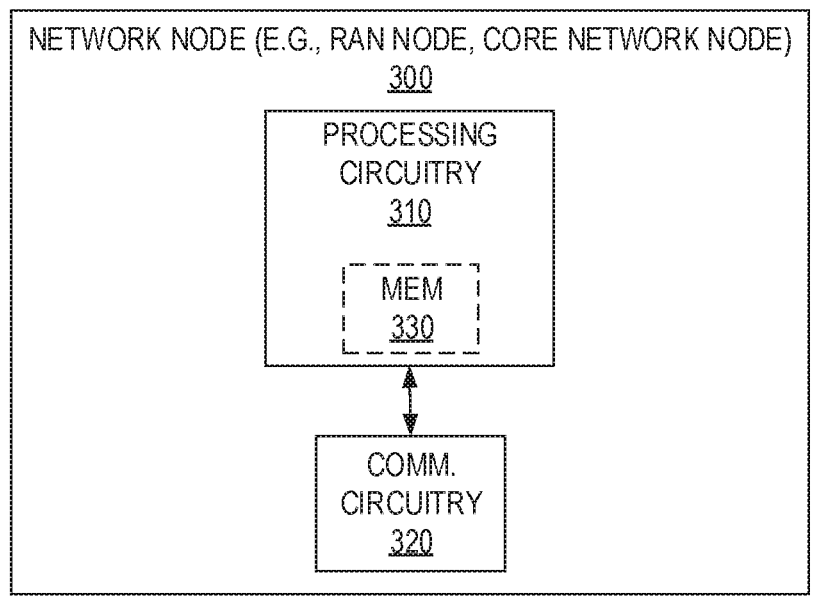
FIGS. 5 and 6 are schematic block diagrams, each of which illustrates an example network node, according to one or more embodiments of the present disclosure.

FIG. 5 illustrates a network node 300 (for example, a RAN node 140 or a core network node 130 in the example network environment 100 shown in FIG. 2) as implemented in accordance with one or more embodiments. As shown, the network node 300 includes processing circuitry 310 and communication circuitry 320. The communication circuitry 320 is configured to transmit and/or receive information to and/or from one or more other nodes, e.g., via any communication technology. The processing circuitry 310 is configured to perform processing described above, such as by executing instructions stored in memory 330. The processing circuitry 310 in this regard may implement certain functional means, units, or modules.

Figure 6:
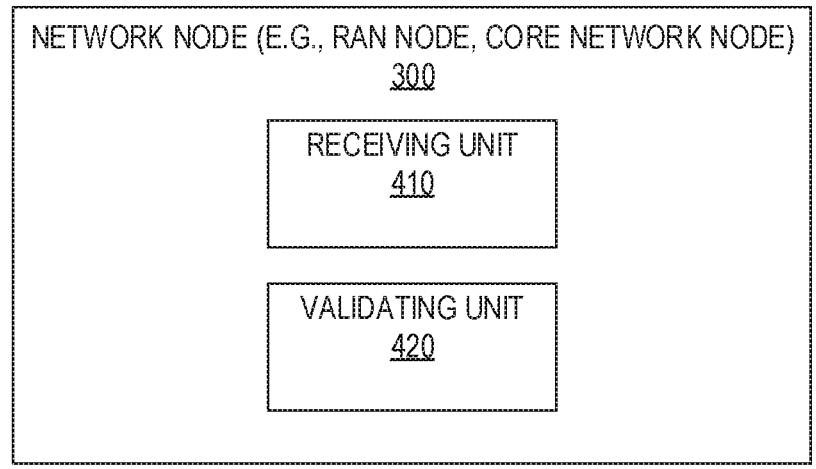

FIG. 6 illustrates a schematic block diagram of an network node 300 in a wireless network according to still other embodiments (for example, a RAN node 140 or a core network node 130 in the example network environment 100 shown in FIG. 2). As shown, the network node 300 implements various functional means, units, or modules, e.g., via the processing circuitry 310 in FIG. 5 and/or via software code. These functional means, units, or modules, e.g., for implementing the method(s) herein, include for instance: receiving unit 410, and validating unit 420.

The receiving unit 410 is configured to receive, over an interface between the network node 300a and a further network node 300b, a message comprising paired user equipment (UE) identifiers for UE identification over the interface to the network node 300a and further network node 300b, respectively.

In some embodiments, the validating unit 420 is configured to, responsive to determining that the identifier for UE identification to the network node 300a uniquely identifies a UE 150 to the network node 300a, validate the message irrespective of whether the identifier for UE identification to the further network node 300b uniquely identifies the UE 150 to the further network node 300b.

In some embodiments, the validating unit 420 is alternatively configured to, irrespective of whether the identifier for UE identification to the further network node 300b uniquely identifies a UE 150 to the further network node 300b, determine that the message is invalid in response to at least one of: determining that the identifier for UE identification to the network node 300a fails to uniquely identify a UE 150 to the network node 300a; and determining that the paired UE identifiers fail to jointly identify a logical UE connection known to the network node 300a.

Those skilled in the art will also appreciate that embodiments herein further include corresponding computer programs.

A computer program comprises instructions which, when executed on at least one processor of a network node 300, cause the network node 300 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

As previously discussed, embodiments of the present disclosure refrain from checking of the uniqueness of the remote AP ID for a UE-associated logical connection. Instead, the node receiving the message checks if the local AP ID is known, and the node receiving a remote AP ID would only check whether that remote AP ID is consistent with the remote AP ID with which the signaling connection has been established.

Figure 7:
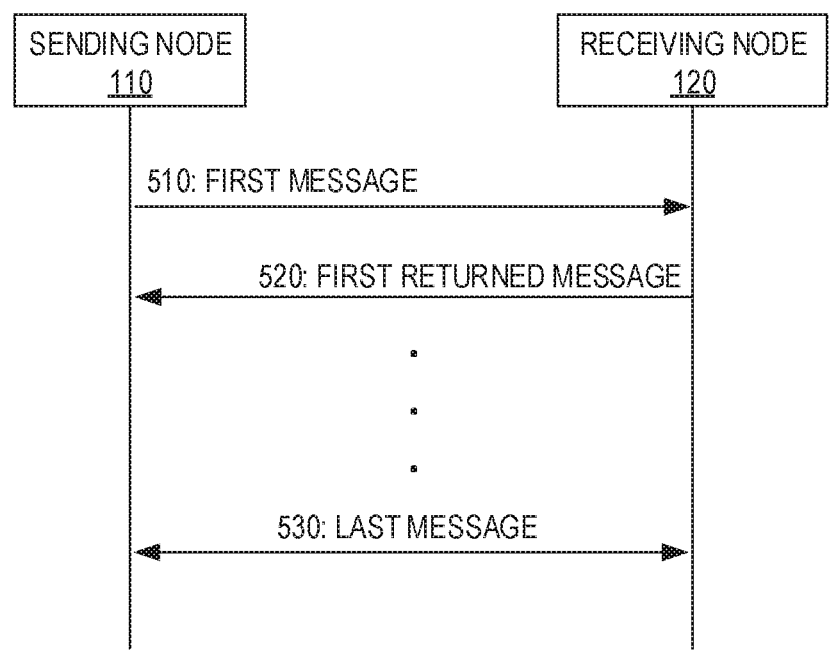
FIG. 7 is a signalling diagram illustrating an example signalling exchange, according to one or more embodiments of the present disclosure.

FIG. 7 illustrates example messaging exchanged between a sending node 110 and a receiving node 120 (each of which may be a network node 300, as discussed above). The exchanged messaging includes a first message 510, a first returned message 520, and a last message 530. The first message 510, first returned message 520, and last message 530 relate to a UE-associated logical connection. The first message 510 comprises a new AP ID from the sending node 110 which is "local" to the sending node 110. That is, the new AP ID in the first message uniquely identifies the UE 150 to the sending node 110 over the interface between the sending node 110 and receiving node 120. The first returned message 520 is the initial message sent by the receiving node 120 to the sending node 110 in response to the first message 510. The first returned message 520 comprises a new AP ID from the receiving node 120, which is "local" to the receiving node 120. That is, the new AP ID provided by the receiving node 120 uniquely identifies the UE 150 to the receiving node 120 over the interface between the sending node 110 and receiving node 120. Thereafter the two AP IDs (i.e., the one allocated by the sending node 110 and the one allocated by the receiving node 120) are included in messages over the UE-associated logical connection unless otherwise allowed by the specification. The last message 530 is a message sent by either the sending node 110 or the receiving node 120 to the other in order to complete termination of a given UE-associated logical connection, such that no other messages for the same connection are expected in either direction.

Throughout the exchange, and according to embodiments, if a network node 300a receives a message that includes an unknown "local" AP ID, or a remote AP ID which is inconsistent with that "local" AP ID (i.e., the known local AP ID is provided together with a remote AP ID that was not used by the remote node so far), the network node 300a detects an error (e.g., determines that the message is invalid). In response, the network node 300a detecting the error may initiate an error indication procedure that indicates an appropriate cause value, e.g., to the other network node 300b.

According to particular embodiments, in response to detecting the error, if this message is neither the first message 510 nor the last message 530 for this UE-associated logical connection, the receiving node 300b initiates the Error Indication procedure with inclusion of the received AP IDs from the sending node 300a and an appropriate cause value. Further, each of the network nodes 300a, 300b initiates a local release of any established UE-associated logical connection (for the same NG interface) that has that AP ID as identifier, which is local to that node.

Alternatively, if this message is the last message 530 for this UE-associated logical connection, the receiving node 300b initiates a local release of any established UE-associated logical connection (for the same NG interface) that has that AP ID as identifiers which is local to the receiving node 300b.

New failure cause values reflect the AP ID handling discussed above. Such failure cause values may, for example, be introduce to those specified by 3GPP TS 38.413 and TS 38.423.

Embodiments of the present disclosure rely on network nodes 300a, 300b, to be responsible for allocating a unique AP ID for a UE-associated logical connection, such that a network node 300a receiving a message over the interface between the network nodes 300a, 300b does not have to check the uniqueness of the remote AP ID for its peer.

Turning now to further details with respect to the handling of particular messages, in some embodiments, the receiving node 120 receiving the first message 510 accepts the remote AP ID value specified by the sending node 110 in the first message 510, and returns to the sending node 110, in the first response message 520, a local AP ID of the receiving node 120. As discussed above, the sending node 110 and receiving node 120 are network nodes 300a, 300b, and each checks whether the AP ID value it has allocated (the local AP ID) is known in messages that are received. If the AP ID is not known, the failure cause may be an "Unknown Local Node UE NGAP ID" (e.g., provided that the interface between the sending node 110 and receiving node 120 is the NGAP interface). If the AP ID is known, then the network node 300 checks whether the remote AP ID is consistent. If inconsistent, the failure cause may be "Inconsistent Remote Node UE NGAP ID" (e.g., provided that the relevant interface is the NGAP interface).

In particular, the Unknown Local Node UE NGAP ID failure cause may indicate that an action has failed because the network node 300 receiving the message does not recognise the local node UE NGAP ID included therein. The Inconsistent Remote Node UE NGAP ID failure cause may indicate that an action has failed because the network node 300 receiving the message considers the remote node UE NGAP ID to be inconsistent (e.g., inconsistent with the local node UE NGAP ID). These two cause codes may, for example, be added to the cause codes listed in TS 38.413, chapter 9.3.1.2.

Similar cause codes may also be provided for other interfaces, such as the XnAP interface. For example, the cause code Unknown Local NG-RAN Node UE XnAP ID may indicate that an action has failed because the network node 300 receiving the message does not recognise the local NG-RAN node UE XnAP ID. The cause code Inconsistent Remote NG-RAN Node UE XnAP ID may indicate that the action has failed because the network node 300 considers the received remote NG-RAN node UE XnAP ID to be inconsistent. These two cause codes may, for example, be added to the cause codes specified in TS 38.423.

In view of all of the above, as well as the disclosure below, TS 38.413 may be updated or modified, e.g., at chapter 10.6 relating to AP ID handling, to include the following language:

NOTE: The "first message", the "first returned message" and the "last message" as used below correspond to messages for a UE-associated logical connection. The "first message" has a new AP ID from the sending node which is a "local" AP ID to the node sending the "first message" and the "first returned message" is the first response message, which has a new AP ID from the node sending the "first returned message" which is a "local" AP ID to the node sending the "first returned message". Thereafter the two AP IDs are included in all messages over the UE-associated logical connection unless otherwise allowed by the specification. The "last message" is a message sent by a node in order to complete the termination of a given UE-associated logical connection, such that no other messages for the same connection are expected in either direction.

If a node receives a message that includes an unknown local AP ID, or a remote AP ID which is inconsistent (i.e., the known local AP ID is provided together with a remote AP ID that was not used by the remote node so far), if this message is neither the first nor the last message for this UE-associated logical connection, the receiving node shall initiate an Error Indication procedure with inclusion of the received AP IDs from the peer node and an appropriate cause value. Each node shall initiate a local release of any established UE-associated logical connection (for the same NG interface) that has that AP ID as identifier, which is local to the node.

if this message is the last message for this UE-associated logical connection, the receiving node shall initiate a local release of any established UE-associated logical connection (for the same NG interface) that has that AP ID as identifiers which is local to the receiving node.

Although the subject matter described herein may be implemented in any appropriate type of system using any suitable components, the embodiments disclosed herein are described in relation to a wireless network, such as the example network environment illustrated in FIG. 2. Although the wireless network of FIG. 2 only depicts a core network node 130, two RAN nodes 140a, 140b, and a UE 150, in practice, such a network may further include any additional elements suitable to support communication, e.g., between wireless devices or between a wireless device and another communication device, such as a landline telephone, a service provider, or any other network node or end device. Thus, the network of various embodiments may provide communication and other types of services to one or more wireless devices to facilitate the wireless devices' access to and/or use of the services provided by, or via, the network.

The network may comprise and/or interface with any type of communication, telecommunication, data, cellular, and/or radio network or other similar type of system. In some embodiments, the network may be configured to operate according to specific standards or other types of predefined rules or procedures. Thus, particular embodiments of the network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards;

wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

The network may comprise one or more backhaul networks, core networks, Internet Protocol (IP) networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

The various components described herein may work together in order to provide network node and/or wireless device functionality, such as providing wireless connections in a wireless network. In different embodiments, the network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node 300 refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and New Radio (NR) NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), Operation and Maintenance (O&M) nodes, Operations Support System (OSS) nodes, Self Optimized Network (SON) nodes, positioning nodes (e.g., E-SMLCs), and/or Minimization of Drive Tests (MDTs). As another example, a network node 300 may be a virtual network node as described in more detail below. More generally, however, network nodes 300 may represent any suitable device (or group of devices) capable, configured, arranged, and/or operable to enable and/or provide a wireless device with access to the wireless network or to provide some service to a wireless device that has accessed the wireless network.

Any appropriate steps, methods, features, functions, or benefits disclosed herein may be performed through one or more functional units or modules, e.g., via processing circuitry 310, which may include one or more microprocessor or microcontrollers, as well as other digital hardware, which may include digital signal processors (DSPs), special-purpose digital logic, and the like. The processing circuitry may be configured to execute program code stored in memory 330, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of message validation performed by a network node, the method comprising:
    receiving, over an interface between the network node and a further network node, a message comprising paired user equipment (UE) identifiers, the paired UE identifiers comprising:
        a first UE identifier for UE identification over the interface to the network node; and
        a second UE identifier for UE identification over the interface to the further network node;
    determining that the first UE identifier for UE identification to the network node uniquely identifies a UE to the network node and, in response, determining that the message is valid irrespective of whether the second UE identifier for UE identification to the further network node uniquely identifies the UE to the further network node.

2. The method of claim 1, wherein determining that the message is valid in further response to determining that the paired UE identifiers jointly identify a logical connection of the UE known to the network node.

3. The method of claim 1, wherein the network node is a radio access network node.

4. The method of claim 1, wherein the network node is a core network node.

5. The method of claim 1, wherein the further network node is a radio access network node.

6. The method of claim 1, wherein the further network node is a core network node.

7. A method of error detection performed by a network node, the method comprising:
  receiving, over an interface between the network node and a further network node, a message comprising paired user equipment (UE) identifiers, the paired UE identifiers comprising:
    a first UE identifier for UE identification over the interface to the network node; and
    a second UE identifier for UE identification over the interface to the further network node;
  irrespective of whether the second UE identifier for UE identification to the further network node uniquely identifies a UE to the further network node, determining that the message is invalid in response to at least one of:
    determining that the first UE identifier for UE identification to the network node fails to uniquely identify a UE to the network node;
    determining that the paired UE identifiers fail to jointly identify a logical UE connection known to the network node.

8. The method of claim 7, further comprising initiating an error indication procedure to trigger release, by the further network node, of a logical connection of a UE identified by at least one of the paired UE identifiers.

9. The method of claim 7, further comprising responsive to determining that the paired UE identifiers fail to jointly identify the logical UE connection known to the network node, releasing a logical connection of a UE identified by the first UE identifier for UE identification to the network node.

10. The method of claim 7, wherein the network node is a radio access network node.

11. The method of claim 7, wherein the network node is a core network node.

12. The method of claim 7, wherein the further network node is a radio access network node.

13. The method of claim 7, wherein the further network node is a core network node.

14. A network node comprising:
  processing circuitry and a memory, the memory containing instructions executable by the processing circuitry whereby the network node is configured to:
    receive, over an interface between the network node and a further network node, a message comprising paired user equipment (UE) identifiers, the paired UE identifiers comprising:
      a first UE identifier for UE identification over the interface to the network node; and
      a second UE identifier for UE identification over the interface to the further network node;
    determine that the first UE identifier for UE identification to the network node uniquely identifies a UE to the network node and, in response, determine that the message is valid irrespective of whether the second UE identifier for UE identification to the further network node uniquely identifies the UE to the further network node.

15. The network node of claim 14, wherein the network node is further configured by the processing circuitry to determine that the message is valid in further response to determining that the paired UE identifiers jointly identify a logical connection of the UE known to the network node.

16. The network node of claim 14, wherein the network node is a radio access network node.

17. The network node of claim 14, wherein the network node is a core network node.

18. The network node of claim 14, wherein the further network node is a radio access network node.

19. The network node of claim 14, wherein the further network node is a core network node.

20. A network node comprising:
  processing circuitry and a memory, the memory containing instructions executable by the processing circuitry whereby the network node is configured to:
    receive, over an interface between the network node and a further network node, a message comprising paired user equipment (UE) identifiers, the paired UE identifiers comprising:
      a first UE identifier for UE identification over the interface to the network node; and
      a second UE identifier for UE identification over the interface to the further network node;
    determine that the message is invalid irrespective of whether the second UE identifier for UE identification to the further network node uniquely identifies a UE to the further network node in response to at least one of:
      determining that the first UE identifier for UE identification to the network node fails to uniquely identify a UE to the network node;
      determining that the paired UE identifiers fail to jointly identify a logical UE connection known to the network node.

21. The network node of claim 20, wherein the network node is further configured by the processing circuitry to initiate an error indication procedure to trigger release, by the further network node, of a logical connection of a UE identified by at least one of the paired UE identifiers.

22. The network node of claim 20, wherein the network node is further configured by the processing circuitry to, responsive to determining that the paired UE identifiers fail to jointly identify the logical UE connection known to the network node, release a logical connection of a UE identified by the first UE identifier for UE identification to the network node.

23. The network node of claim 20, wherein the network node is a radio access network node.

24. The network node of claim 20, wherein the network node is a core network node.

25. The network node of claim 20, wherein the further network node is a radio access network node.

26. The network node of claim 20, wherein the further network node is a core network node.

* * * * *